(12) United States Patent
Laaker et al.

(10) Patent No.: US 12,131,102 B2
(45) Date of Patent: *Oct. 29, 2024

(54) ADDITIVE MANUFACTURING METHOD INCLUDING THERMAL MODELING AND CONTROL

(71) Applicant: Carbon, Inc., Redwood City, CA (US)

(72) Inventors: Kyle Laaker, Redwood City, CA (US); Bob E. Feller, San Mateo, CA (US); Matthew Panzer, Redwood City, CA (US)

(73) Assignee: Carbon, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/450,575

(22) Filed: Oct. 12, 2021

(65) Prior Publication Data

US 2022/0100915 A1 Mar. 31, 2022

Related U.S. Application Data

(63) Continuation of application No. 17/050,605, filed as application No. PCT/US2019/038211 on Jun. 20, 2019, now Pat. No. 11,151,292.

(Continued)

(51) Int. Cl.
*G06F 30/10* (2020.01)
*B29C 64/124* (2017.01)
(Continued)

(52) U.S. Cl.
CPC ............ *G06F 30/10* (2020.01); *B29C 64/124* (2017.08); *B29C 64/393* (2017.08); *B33Y 10/00* (2014.12); *B33Y 50/02* (2014.12); *G06F 2113/10* (2020.01)

(58) Field of Classification Search
CPC ... G06F 30/10; G06F 2113/10; B29C 64/124; B29C 64/393; B29C 64/364; B33Y 10/00; B33Y 50/02
(Continued)

(56) References Cited

U.S. PATENT DOCUMENTS

| 2,933,711 A | 4/1960 | Eaton |
| 3,363,214 A | 1/1968 | Wright |

(Continued)

FOREIGN PATENT DOCUMENTS

| CN | 205439264 U | * | 8/2016 |
| CN | 106346775 A | | 1/2017 |

(Continued)

OTHER PUBLICATIONS

International Preliminary Report on Patentability corresponding to PCT/US2019/038211; dated Dec. 29, 2020 (7 pages).
(Continued)

*Primary Examiner* — Chun Cao
*Assistant Examiner* — Michael Tang
(74) *Attorney, Agent, or Firm* — Myers Bigel, P.A.

(57) ABSTRACT

Various embodiments described herein provide a method of making an object from a three-dimensional geometry file and a light polymerizable resin on a light-transmissive window by projection of light through the window in a bottom-up stereolithography process. The method may comprise: slicing the file into a series of sequential images. Temperature fluctuations in the resin may be calculated for at least some of the sequential images upon light polymerization thereof based on sequential exposure of the resin to light, the light corresponding to the series of sequential images. During producing of the object, the production may be modified based on the calculated temperature fluctuations by: (i) reducing production speed during at least a portion of
(Continued)

the production; (ii) activating a window cooler during at least a portion of the production; or (iii) increasing production speed during at least a portion of the production.

19 Claims, 3 Drawing Sheets

Related U.S. Application Data

(60) Provisional application No. 62/690,542, filed on Jun. 27, 2018.

(51) Int. Cl.
*B29C 64/393* (2017.01)
*B33Y 10/00* (2015.01)
*B33Y 50/02* (2015.01)
*G06F 113/10* (2020.01)

(58) Field of Classification Search
USPC .......................................... 700/118; 264/401
See application file for complete search history.

(56) References Cited

U.S. PATENT DOCUMENTS

| | | | |
|---|---|---|---|
| 5,236,637 A | 8/1993 | Hull | |
| 5,391,072 A | 2/1995 | Lawton et al. | |
| 5,529,473 A | 6/1996 | Lawton et al. | |
| 7,438,846 B2 | 10/2008 | John | |
| 7,517,222 B2 | 4/2009 | Rohrbach et al. | |
| 7,874,844 B1 | 1/2011 | Fitts | |
| 7,892,474 B2 | 2/2011 | Shkolnik et al. | |
| 8,110,135 B2 | 2/2012 | El-Siblani | |
| 8,120,468 B2 | 2/2012 | Kangas | |
| 8,526,910 B2 | 9/2013 | Messerly | |
| 9,205,601 B2 | 12/2015 | Desimone et al. | |
| 9,211,678 B2 | 12/2015 | Desimone et al. | |
| 9,216,546 B2 | 12/2015 | Desimone et al. | |
| 9,220,362 B2 | 12/2015 | Eades et al. | |
| 9,360,757 B2 | 6/2016 | Desimone et al. | |
| 9,373,201 B2 | 6/2016 | Jefferies et al. | |
| 9,453,142 B2 | 9/2016 | Rolland et al. | |
| 9,498,920 B2 | 11/2016 | Desimone et al. | |
| 9,562,429 B2 | 2/2017 | Walton et al. | |
| 9,576,476 B2 | 2/2017 | Yang | |
| 9,587,487 B2 | 3/2017 | Walton et al. | |
| 9,589,428 B2 | 3/2017 | Edwards et al. | |
| 9,595,058 B2 | 3/2017 | Khalid | |
| 9,598,606 B2 | 3/2017 | Rolland et al. | |
| 9,676,963 B2 | 6/2017 | Rolland et al. | |
| 9,766,287 B2 | 9/2017 | Narasaki et al. | |
| 9,795,528 B1 | 10/2017 | Delmestri et al. | |
| 9,841,186 B2 | 12/2017 | Cho et al. | |
| 10,259,171 B2 | 4/2019 | Robeson et al. | |
| 10,434,706 B2 | 10/2019 | Robeson et al. | |
| 2009/0130449 A1 | 5/2009 | El-Siblani | |
| 2013/0292862 A1 | 11/2013 | Joyce | |
| 2013/0295212 A1 | 11/2013 | Chen et al. | |
| 2014/0163717 A1* | 6/2014 | Das ..................... B33Y 70/00 700/119 |
| 2015/0097315 A1* | 4/2015 | DeSimone ............ B33Y 10/00 425/166 |
| 2015/0174658 A1* | 6/2015 | Ljungblad ............. B22F 10/20 425/141 |
| 2016/0046075 A1 | 2/2016 | Desimone et al. | |
| 2016/0116528 A1 | 4/2016 | Narasaki et al. | |
| 2016/0136889 A1* | 5/2016 | Rolland ............. C08F 283/006 264/1.27 |
| 2016/0193786 A1 | 7/2016 | Moore et al. | |
| 2016/0200052 A1 | 7/2016 | Moore et al. | |
| 2016/0288376 A1 | 10/2016 | Sun et al. | |
| 2017/0056970 A1* | 3/2017 | Chin ...................... B22F 10/43 |
| 2017/0129169 A1 | 5/2017 | Batchelder et al. | |
| 2017/0260418 A1 | 9/2017 | Wu et al. | |
| 2017/0297098 A1* | 10/2017 | Myerberg ............ B29C 64/386 |
| 2018/0065302 A1 | 3/2018 | Arai et al. | |
| 2018/0126630 A1 | 5/2018 | Panzer et al. | |
| 2018/0134029 A1 | 5/2018 | Myerberg et al. | |
| 2018/0229303 A1* | 8/2018 | Burlatsky .............. B33Y 10/00 |
| 2018/0243976 A1 | 8/2018 | Feller | |
| 2018/0290374 A1 | 10/2018 | Willis et al. | |
| 2018/0304526 A1 | 10/2018 | Feller et al. | |
| 2019/0079493 A1* | 3/2019 | Yang ..................... B29C 64/393 |
| 2019/0095555 A1* | 3/2019 | Lopez .................... G06F 30/17 |
| 2019/0160733 A1* | 5/2019 | Mirkin .................. B33Y 40/00 |
| 2019/0255765 A1* | 8/2019 | Takeyama .......... G03G 15/2039 |

FOREIGN PATENT DOCUMENTS

| | | |
|---|---|---|
| CN | 108602249 B | 3/2021 |
| WO | 2015164234 A1 | 10/2015 |
| WO | 2015195924 A1 | 12/2015 |
| WO | 2016007495 A1 | 1/2016 |
| WO | 2016123499 A1 | 8/2016 |
| WO | 2016123506 A1 | 8/2016 |
| WO | 2016133759 A1 | 8/2016 |
| WO | 2016140886 A1 | 9/2016 |
| WO | 2016145182 A1 | 9/2016 |
| WO | 2016149014 A1 | 9/2016 |
| WO | 2016149097 A1 | 9/2016 |
| WO | 2016172788 A1 | 11/2016 |
| WO | 2016172804 A1 | 11/2016 |
| WO | 2016172805 A1 | 11/2016 |
| WO | 2017210298 A1 | 12/2017 |

OTHER PUBLICATIONS

International Search Report and Written Opinion corresponding to PCT/US2019/038211; dated Oct. 18, 2019 (14 Pages).
International Search Report and Written Opinion corresponding to PCT/US2019/062762; mailed Feb. 20, 2020 (13 pages).
Bártolo, Paulo Jorge , "Stereolithography: Materials, Processes and Applications", Boston, MA: Springer US., 2011, 201-243.
Corcione, Esposito C., et al., "Temperature evolution during stereolithography building with a commercial epoxy resin", Polymer Engineering and Science, 46(4), 2006, 493-502.
Janusziewicz, Rima , et al., "Layerless fabrication with continuous liquid interface production", PNAS, 113, 2016, 11703-11708.
Ligon, Samuel Clark, et al., "Polymers for 3D printing and customized additive manufacturing", Chemical Reviews. 117(15), 2017, 10212-10290.
Poelma, Justin , et al., "Rethinking digital manufacturing with polymers", Science, 358(6369), 2017, 1384-1385.
Sager, Benay , et al., "Simulation Methods for Stereolithography", In: Bártolo P. (eds) Stereolithography. Springer, Boston, MA., 2011, 183-241.
Tumbleston, John R., et al., "Continuous liquid interface production of 3D Objects", Science, 347(6228), 2015, 1349-1352.

* cited by examiner

ADDITIVE MANUFACTURING METHOD INCLUDING THERMAL MODELING AND CONTROL

RELATED APPLICATIONS

This application is a continuation of U.S. application Ser. No. 17/050,605, filed Oct. 26, 2020, which is a 35 U.S.C. § 371 national phase entry of International Application No. PCT/US2019/038211, filed Jun. 20, 2019, which claims priority to U.S. Provisional Application Ser. No. 62/690,542, filed Jun. 27, 2018, the disclosure of each of which is incorporated by reference herein in its entirety.

TECHNICAL FIELD

The present invention concerns additive manufacturing, and particularly concerns methods, apparatus, and systems for controlling thermal effects created by an additive manufacturing process.

BACKGROUND

A group of additive manufacturing techniques sometimes referred to as "stereolithography" create a three-dimensional object by the sequential polymerization of a light polymerizable resin. Such techniques may be "bottom-up" techniques, where light is projected into the resin onto the bottom of the growing object through a light transmissive window, or "top down" techniques, where light is projected onto the resin on top of the growing object, which is then immersed downward into the pool of resin.

The recent introduction of a more rapid stereolithography technique known as continuous liquid interface production (CLIP), coupled with the introduction of "dual cure" resins for additive manufacturing, has expanded the usefulness of stereolithography from prototyping to manufacturing CLIP is described in, among other sources, J. Tumbleston, D. Shirvanyants, N. Ermoshkin et al., Continuous liquid interface production of 3D Objects, Science 347, 1349-1352 (published online 16 Mar. 2015), and in U.S. Pat. Nos. 9,211,678; 9,205,601; and 9,216,546 to DeSimone et al.

Dual cure resins for additive manufacturing are described in, among other sources, J. Peolma and J. Rolland, Rethinking digital manufacturing with Polymers, Science 358, 1384-1385 (15 Dec. 2017) and in U.S. Pat. Nos. 9,676,963, 9,453,142 and 9,598,606 to Rolland et al.

Polymers for additive manufacturing are described in, among other sources, S. C. Ligon, et al., Polymers for 3D Printing and Customized Additive Manufacturing, Chemical Reviews 2017 117 (15), 10212-10290.

SUMMARY

One artifact of increasing speed of production in additive manufacturing is that an excessive exothermic reaction may occur during the polymerization process. Significant exothermic reactions may create potential "hot-spots" in an object created using the thermosetting polymer reins, which may result in heat-induced shrinkage. The present application provides methods, devices, and systems for minimizing the effect of such potential hot-spots by modeling the thermal characteristics of an additive manufacturing session, and for controlling devices and systems to combat unwanted thermal excesses.

Various embodiments described herein provide a method of making an object from a three-dimensional geometry file (e.g., an .stl file) and a light polymerizable resin on a light-transmissive window by projection of light through the window in a bottom-up stereolithography process. The method may comprise: (a) slicing the file into a series of sequential images (e.g., .png images), where each sequential image corresponds to a part geometry; and (b) calculating temperature fluctuations in the resin for at least a subset of the sequential images upon light polymerization thereof based on sequential exposure of the resin to light, the light corresponding to the series of sequential images. The calculating may carried out based on resin properties and object geometry. The method may further include producing the object from the light polymerizable resin and the series of sequential images by bottom-up stereolithography. While producing the object from the light polymerizable resin, (d) the production may be modified based on the calculated temperature fluctuations by: (i) reducing production speed during at least a portion of the production that corresponds to at least one of the subset of the sequential images to avoid exceeding a predetermined temperature limit for the window or the resin (e.g., to avoid damaging the window); (ii) activating a window cooler to during at least a portion of the production that corresponds to at least one of the subset of the sequential images to cool the window and avoid exceeding a predetermined temperature limit for the window (e.g., to at least partially maintain, or increase, production speed while avoiding damaging the window); or (iii) increasing production speed during at least a portion of the production that corresponds to at least one of the subset of the sequential images based on a change in resin properties (e.g., reduced viscosity) caused by local temperature fluctuations.

In some embodiments, the subset of images includes images corresponding to portions of the object spaced apart from each other in a Z-direction in fixed increments.

In some embodiments, the calculating step is based on a solution of a partial differential equation (e.g., a Gaussian heat kernel).

In some embodiments, the calculating step (b) is carried out before the producing step (c) or concurrently with the producing step (c).

In some embodiments, the calculating step (b) is further based on planned or actual speed of the producing step (c).

In some embodiments, the window is heated, the calculating step is carried out based on window properties, and the window properties include a temperature profile for said heated window.

In some embodiments, the window cooler comprises a Peltier cooler.

In some embodiments, the window comprises a composite of at least two layers of different materials (e.g., a polymer layer, such as a fluoropolymer layer, on an inorganic supporting layer, such as a silicate glass, sapphire, or ALON (aluminum oxynitride) layer), optionally but in some embodiments preferably joined with an adhesive layer.

Various embodiments described also provide an additive manufacturing system including an additive manufacturing apparatus configured to construct an object from a light polymerizable resin on a light-transmissive window by projection of light through the window in a bottom-up stereolithography process; a processor; and memory storing non-transitory computer readable instructions that, when executed by the processor, cause the processor to carry out the method embodiments described herein.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

Figure 1:
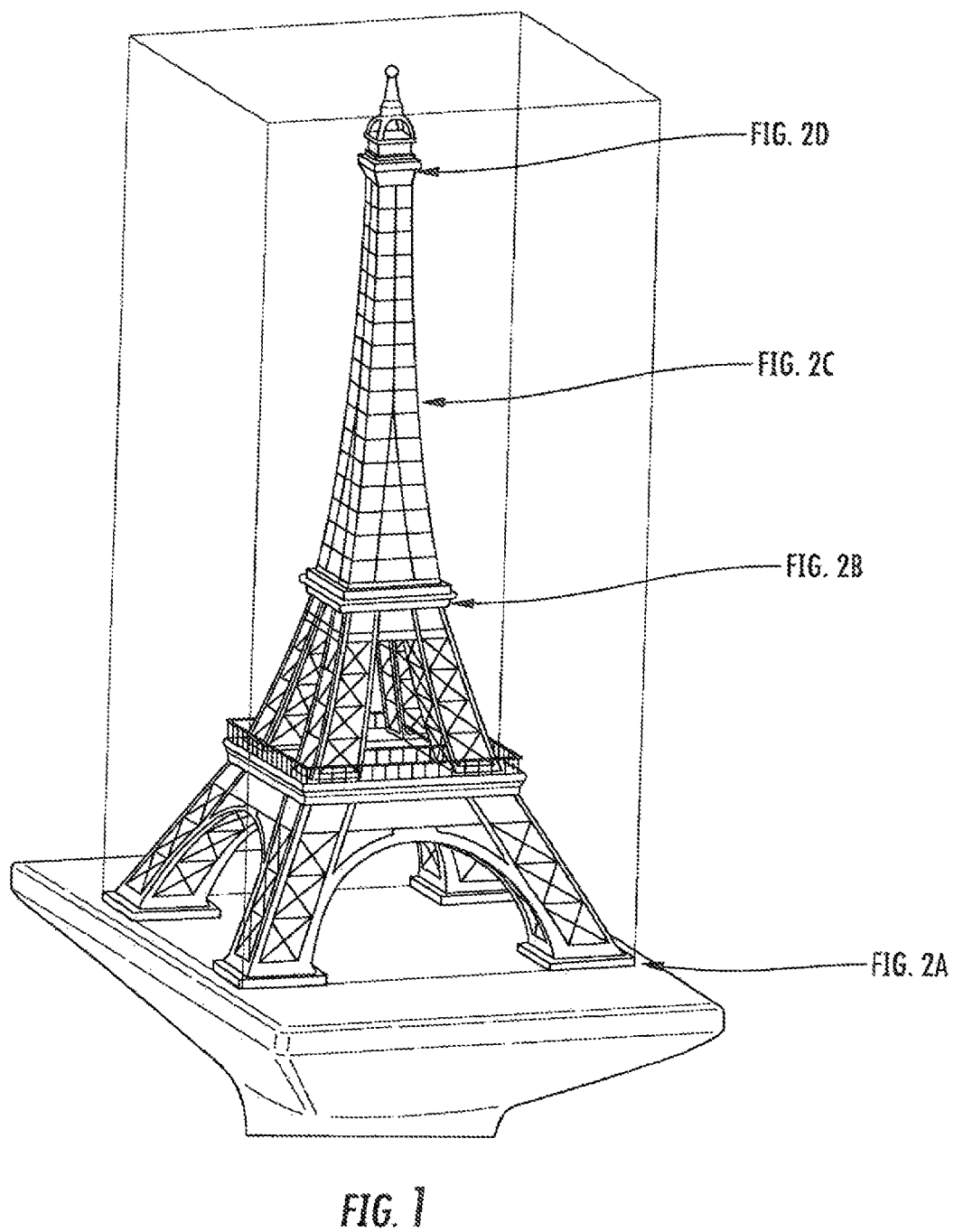
FIG. 1 shows an example for a part (e.g., a model of the Eiffel Tower in Paris, France) that may be manufactured using an additive manufacturing technique.
Figure 2:
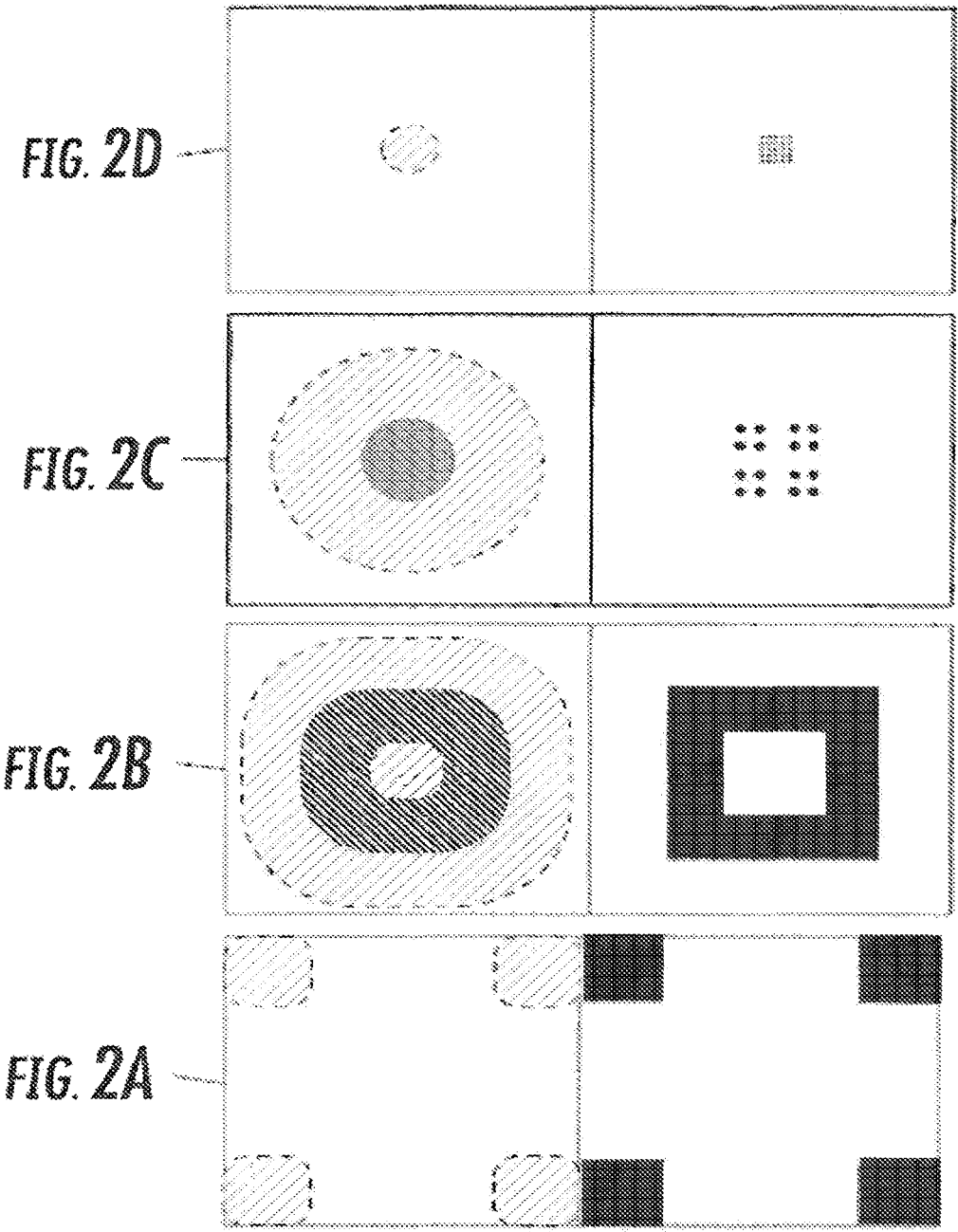
FIGS. 2A, 2B, 2C, and 2D illustrate, on the right side of the Figures, cross-sectional areas of the tower model at identified points in FIG. 1, and on the left side of the Figures show simulated hot-spots that may result in unwanted or deleterious effects in the part when manufactured according to the additive manufacturing technique.

The present inventive concepts are now described more fully hereinafter with reference to the accompanying drawings, in which embodiments of the inventive concepts are shown. The inventive concepts may, however, be embodied in many different forms and should not be construed as limited to the embodiments set forth herein; rather these embodiments are provided so that this disclosure will be thorough and complete and will fully convey the scope of the inventive concepts to those skilled in the art.

The terminology used herein is for the purpose of describing particular embodiments only and is not intended to be limiting of the inventive concepts. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this disclosure belongs. It will be further understood that terms, such as those defined in commonly-used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present disclosure. The sequence of operations (or steps) is not limited to the order presented in the claims or figures unless specifically indicated otherwise.

1. Polymerizable Liquids (Resins).

Numerous resins for use in additive manufacturing are known and can be used in carrying out the present invention. See, e.g., U.S. Pat. No. 9,205,601 to DeSimone et al. In some embodiments, the resin is a dual cure resin. Such resins are described in, for example, Rolland et al., U.S. Pat. Nos. 9,676,963; 9,598,606; and 9,453,142, and in Wu et al., US Patent Application Pub. No. US2017/0260418, the disclosures of which are incorporated herein by reference.

Resins may be in any suitable form, including "one pot" resins and "dual precursor" resins (where cross-reactive constituents are packaged separately and mixed together before use, and which may be identified as an "A" precursor resin and a "B" precursor resin).

Particular examples of suitable resins include, but are not limited to, Carbon, Inc. rigid polyurethane resin (RPU), flexible polyurethane resin (FPU), elastomeric polyurethane resin (EPU), cyanate ester resin (CE), epoxy resin (EPX), or urethane methacrylate resin (UMA), all available from Carbon, Inc., 1089 Mills Way, Redwood City, California 94063 USA.

Note that, in some embodiments employing "dual cure" polymerizable resins, the part, following manufacturing, may be contacted with a penetrant liquid, with the penetrant liquid carrying a further constituent of the dual cure system, such as a reactive monomer, into the part for participation in a subsequent cure. Such "partial" resins are intended to be included herein.

2. Production by Additive Manufacturing.

Polymerizable liquids or resins as described herein may be used to make three-dimensional objects, in a "light" cure (typically by additive manufacturing) which in some embodiments generates a "green" intermediate object, followed in some embodiments by a second (typically heat) cure of that intermediate object.

Techniques for additive manufacturing are known. Suitable techniques include bottom-up additive manufacturing, or bottom-up stereolithography. Such methods and techniques are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the intermediate object is formed by continuous liquid interface production (CLIP). CLIP methods and apparatus are known and described in, for example, PCT Application Nos. PCT/US2014/015486 (published as U.S. Pat. No. 9,211,678 on Dec. 15, 2015); PCT/US2014/015506 (also published as U.S. Pat. No. 9,205,601 on Dec. 8, 2015), PCT/US2014/015497 (also published as U.S. Pat. No. 9,216,546 on Dec. 22, 2015), and in J. Tumbleston, D. Shirvanyants, N. Ermoshkin et al., Continuous liquid interface production of 3D Objects, Science 347, 1349-1352 (published online 16 Mar. 2015). See also R. Janusziewcz et al., Layerless fabrication with continuous liquid interface production, Proc. Natl. Acad. Sci. USA 113, 11703-11708 (Oct. 18, 2016). In some embodiments, CLIP employs features of a bottom-up three-dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and potentially obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

After the intermediate three-dimensional object is formed, it is optionally cleaned, optionally dried (e.g., air dried) and/or rinsed (in any sequence). In some embodiments it is then further cured, preferably by heating (although further curing may in some embodiments be concurrent with the first cure, or may be by different mechanisms such as contacting to water, as described in U.S. Pat. No. 9,453,142 to Rolland et al.).

3. Thermal Modeling.

FIG. 1 shows an example for a part (e.g., a model of the Eiffel Tower in Paris, France) that may be manufactured using an additive manufacturing technique. FIGS. 2A, 2B, 2C, and 2D illustrate, on the right side of the Figures, cross-sectional areas of the tower model at identified points in FIG. 1, and on the left side of the Figures show simulated hot-spots that may result in unwanted or deleterious effects in the part when manufactured according to the additive manufacturing technique. For example, such hot-spots may result in heat-induced shrinkage at locations within the completed part. As disclosed herein, devices, systems, and methods may compensate for such deleterious effects without going through a trial and error process of generating ideal production part parameters, by modeling the temperature of the object during manufacturing, and by modifying production (e.g., modifying production parameters) during the production process.

By way of explanation of how to model the thermal or temperature properties of the additive manufacturing material (e.g., a thermosetting polymer resin), consider the function:

$$T(x,t) = (4\pi kt)^{-1/2} \exp(-x^2/4kt)$$

In the equation above, k is the thermal diffusivity of the material (with example units of m²/s), t is time (with example units of seconds), x is the distance from the center of the heat pulse, and T is the temperature response for a unit impulse, with arbitrary units. The impulse response for a temperature spike is a Gaussian distribution, modeled as:

$$\frac{1}{\sigma\sqrt{2\pi}} e^{-\frac{(x-\mu)^2}{2\sigma^2}}$$

The convolution of the function may look like:

$$Temp(x, t) = \int_{-\infty}^{\infty} Temp(\xi, t_o) \cdot \sqrt{4\pi kt}\, e^{\frac{(x-\xi)^2}{4kt}} d\xi$$

Where $\xi$ is a spatial variable used for performing the convolution.

Hence, in performing the convolution, the units may become temperature units (e.g., Celsius or Kelvin units). This may be seen in that the impulse response has example units of [1/m], temperature has units of [K], the convolution adds a distance, which cancels out the [1/m] units, leaving temperature.

Accordingly, when an image is split into small pieces, such as pixels, localized temperature spikes due to curing may be calculated, and convolved with a Gaussian distribution, thus "blurring" the spike, enabling an examination into how temperature appears in a two-dimensional plane. This term may be further refined by inclusion of additional terms, such a heat loss term based on e.g., Newton's law of cooling and/or an exponential decay term). For example, heat loss to an environment may be modeled as:

$$T(t_1, x) = T(t_0, x) * e^{-\frac{t}{\tau}}$$

Heat addition may be modeled as:

$$T(t_1,x) = T(t_0,x) + \Delta T(x)$$

where $\Delta T$ is the expected temperature increase for curing a given slice thickness.

Lateral heat dissipation may be modeled as:

$$T(x,t) = \int_{-\infty}^{\infty} Temp(\xi, t_o) \cdot \sqrt{4\pi kt}\, e^{\frac{(x-\xi)^2}{4kt}} d\xi$$

$\xi$ is a spatial "dummy" variable for the convolution and k is thermal diffusivity in units of $$\frac{L^2}{T} \text{ e.g. } \left[\frac{m^2}{s}\right] \text{ or } \left[\frac{\mu m^2}{s}\right],$$

depending on what x and $\xi$ are in.

4. Thermal Control.

The above modeling technique may be used to calculate a piece-by-piece (e.g., pixel-by-pixel) approximation of temperature in a two-dimensional image with significantly high fidelity, available to a device or system with relatively low computational requirements.

Figure 3:
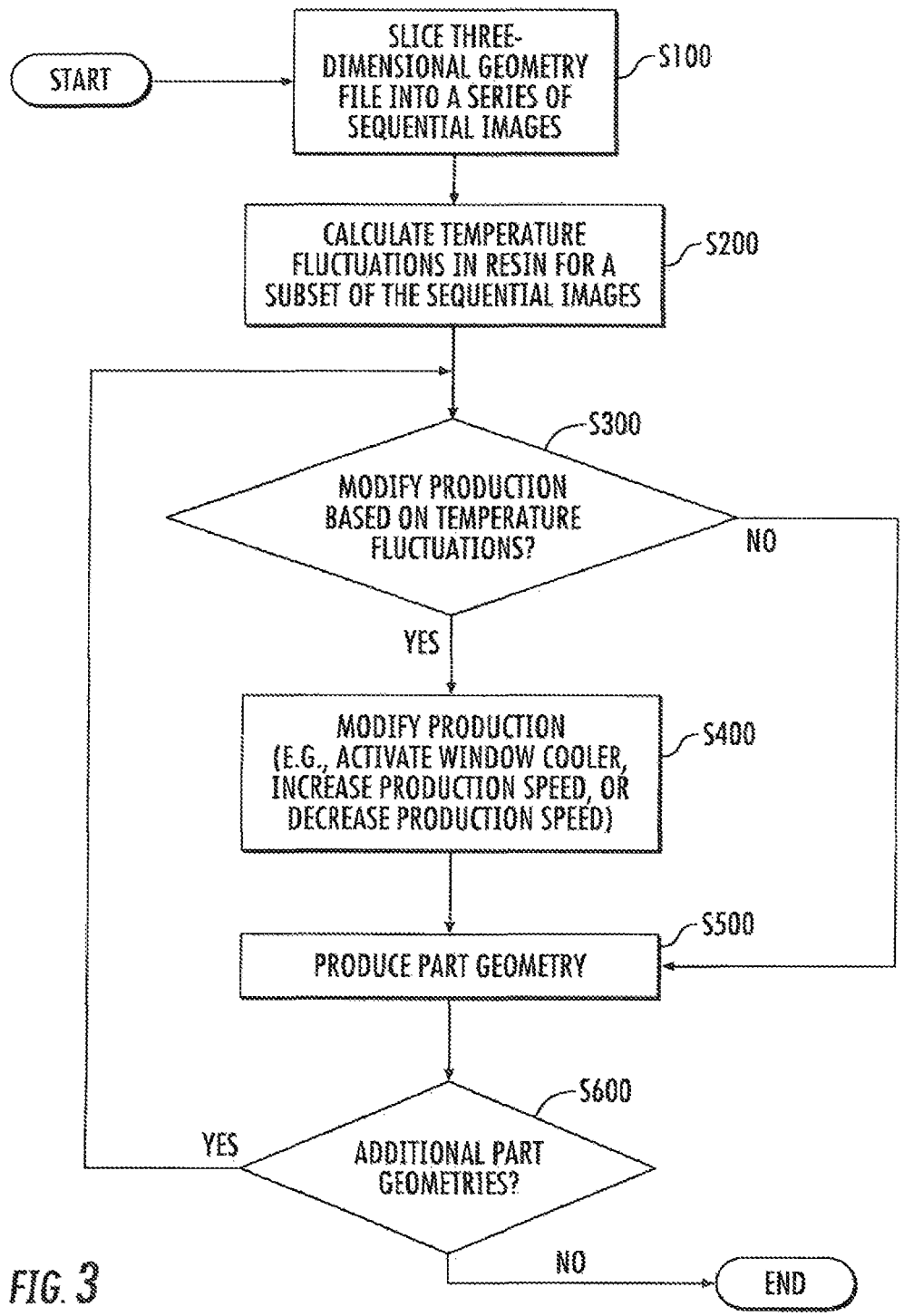
FIG. 3 illustrates a flowchart of operations that may be used in methods of making an object from a three-dimensional geometry file and a light polymerizable resin on a light-transmissive window by projection of light through the window in a bottom-up stereolithography process.

FIG. 3 illustrates a flowchart that may be used in accordance with the present disclosure to use in the calculating of the thermal model. For example, the flowchart of FIG. 3 may be used in a method of making an object from a three-dimensional geometry file (e.g., an .stl file) and a light polymerizable resin on a light-transmissive window by projection of light through the window in a bottom-up stereolithography process.

In a first operation, S100, the three-dimensional geometry file may be sliced into a series of sequential images (e.g., .png images). Each sequential image may correspond to a part geometry. In operation S200, temperature fluctuations in the resin may be calculated for at least a subset of said sequential images upon light polymerization thereof based on sequential exposure of the resin to light. The light may correspond to the series of sequential images. The calculating may be carried out based on resin properties and object geometry, using the thermal modeling technique discussed above. The series of sequential images may then be used to produce said object from said light polymerizable resin and said series of sequential images by bottom-up stereolithography, with each image used to generate a part geometry of the object (as seen in operation S500) until the series of images has been processed (as seen in operation S600). However, based on the calculated temperature fluctuations, the producing of said object may be modified (as seen in operations S300 and S400). For example, a production speed may be reduced during at least a portion of the producing operation that corresponds to at least one of the subset of said sequential images to avoid exceeding a predetermined temperature limit for said window (e.g., to avoid damaging the window). As another example, a window cooler may be activated during at least a portion of said producing operation that corresponds to at least one of the subset of said sequential images to cool said window and avoid exceeding a predetermined temperature limit for said window (e.g., to at least partially maintain, or increase, production speed while avoiding damaging the window). As a third example, production speed may be increased during at least a portion of the producing operation that corresponds to at least one of the subset of said sequential images based on a change in resin properties (e.g., reduced viscosity) caused by local temperature fluctuations.

With respect to activating a window cooler to cool said window, any suitable cooler may be used to carry out the present invention. In some embodiments, the cooler can be simply a fan or blower positioned for blowing air that is cooler than the window (including air at ambient temperature) at the window bottom surface. In some embodiments, the cooler can comprise a compressor and a refrigerant system, or a heat exchanger, operatively associated with the window. In some embodiments, the cooler can comprise one or more thermoelectric devices (e.g., Peltier coolers) operatively associated with the window, and optionally but preferably also operatively associated with a heat sink (which heat sink may be the deck or support structure for the window, a separate heat sink with cooling fins, etc., including combinations thereof). When one or more thermoelectric devices is employed as the window, the window is preferably comprised of a sapphire, ALON, or other thermally conductive supporting member (upon which a semipermeable layer such as a fluoropolymer may be supported), and the thermoelectric devices are thermally coupled (directly or through one or more additional thermally conductive components) to peripheral edge portions of the window. Combinations of multiple different cooling systems, such as both blowers and thermoelectric devices, may also be used 5. Architecture.

According to aspects of the present disclosure, one or more computing devices may be deployed to perform the thermal modeling of the additive manufacturing session and/or to control the thermal properties of the resin or window to avoid unwanted effects in the final manufactured object. Nevertheless, it will be appreciated that any of a variety of different architectures can be employed. Controllers can be a general purpose computer dedicated to, or on board, a particular apparatus; a local general purpose computer operatively associated with a group of machines via a local area network (or metropolitan area network); a remote general purpose computer operatively associated with machines via a wide area network or internet connection; and combinations thereof (for example, organized in a client-server architecture and/or distributed architecture).

Peripheral devices for data entry and display can be implemented in any of a variety of ways known in the art, including typical keypad entry, video display, and printing apparatus, as well as graphical user interfaces such as touch-pads, touch-screens and the like, including smartphone touch screens.

The modeling computing devices and/or controlling computing devices may use hardware, software implemented with hardware, firmware, tangible computer-readable storage media having instructions stored thereon, and/or a combination thereof, and may be implemented in one or more computer systems or other processing systems. The modeling computing devices and/or controlling computing devices may also utilize a virtual instance of a computer. As such, the devices and methods described herein may be embodied in any combination of hardware and software that may all generally be referred to herein as a "circuit," "module," "component," and/or "system." Furthermore, aspects of the present invention may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

In some embodiments, the modeling computing devices and/or controlling computing devices may include at least one processor. The at least one processor of the modeling computing devices and/or controlling computing devices may be configured to execute computer program code for carrying out operations for aspects of the present invention, which computer program code may be written in any combination of one or more programming languages, including an object oriented programming language such as Java, Scala, Smalltalk, Eiffel, JADE, Emerald, C++, C#, VB.NET, or the like, conventional procedural programming languages, such as the "C" programming language, Visual Basic, Fortran 2003, COBOL 2002, PHP, ABAP, dynamic programming languages such as Python, PERL, Ruby, and Groovy, or other programming languages.

The at least one processor may be, or may include, one or more programmable general purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices, which may be collocated or distributed across one or more data networks.

Data storage or memory of the modeling computing devices and/or controlling computing devices can be on separate (volatile and/or non-volatile) memory devices located locally or remotely, partitioned sections of a single memory device, etc., including combinations thereof (e.g., a remote back-up memory in addition to a local memory). For example, the database referred to herein may be one or more databases stored locally to the modeling computing devices and/or controlling computing devices or remote. In some embodiments, the database may be remotely accessible by the modeling computing devices and/or controlling computing devices.

What is claimed is:

1. A method of making an object from a three-dimensional geometry file and a light polymerizable resin on a light-transmissive window by projection of light through the window in a bottom-up stereolithography process, the method comprising the steps of:
   (a) slicing the file into a series of sequential images, each sequential image corresponding to a part geometry;
   (b) prior to beginning production of said object, calculating temperature fluctuations in the resin for at least a subset of said sequential images upon light polymerization thereof based on sequential exposure of the resin to light, the light corresponding to the series of sequential images, with the calculating carried out for each sequential image of said subset of said sequential images pixel-by-pixel based on resin properties and the corresponding part geometry; and
   (c) producing said object from said light polymerizable resin and said series of sequential images by bottom-up stereolithography, while
   (d) modifying said producing step based on said calculated temperature fluctuations by:
      (i) reducing production speed during at least a portion of the producing step that corresponds to at least one of the subset of said sequential images to avoid exceeding a predetermined temperature limit for said window; or
      (ii) activating a window cooler during at least a portion of said producing step that corresponds to at least one of the subset of said sequential images to cool said window and avoid exceeding the predetermined temperature limit for said window.

2. A method of making an object from a three-dimensional geometry file and a light polymerizable resin on a light-transmissive heated window by projection of light through the window in a bottom-up stereolithography process, said heated window comprising a composite of at least two layers of different materials joined with an adhesive layer, said method comprising the steps of:
   (a) slicing the file into a series of sequential images, each sequential image corresponding to a part geometry;
   (b) prior to beginning production of said object, calculating temperature fluctuations in the resin for at least a subset of said sequential images upon light polymerization thereof based on sequential exposure of the resin to light, the light corresponding to the series of sequential images, with the calculating carried out for each sequential image of said subset of said sequential images pixel-by-pixel based on resin properties and the corresponding part geometry and further based on window properties including a temperature profile for said heated window; and
   (c) producing said object from said light polymerizable resin and said series of sequential images by bottom-up stereolithography, while
   (d) modifying said producing step based on said calculated temperature fluctuations by:
      (i) reducing production speed during at least a portion of the producing step that corresponds to at least one of the subset of said sequential images to avoid exceeding a predetermined temperature limit for said; or
      (ii) activating a window cooler during at least a portion of said producing step that corresponds to at least one of the subset of said sequential images to cool said window and avoid exceeding the predetermined temperature limit for said window.

3. The method of claim 2, wherein the subset of said sequential images includes images corresponding to portions of the object spaced apart from each other in a Z-direction in fixed increments.

4. The method of claim 2, wherein said calculating step (b) is based on a solution of a partial differential equation.

5. The method of claim 2, wherein said calculating step (b) is further based on planned or actual speed of said producing step (c).

6. The method of claim 2, wherein said window cooler comprises a Peltier cooler.

7. The method of claim 2, wherein said composite of said at least two layers of different materials comprises a first layer that is a polymer layer.

8. The method of claim 7, wherein said polymer layer is a fluoropolymer layer.

9. The method of claim 7, wherein said composite of said at least two layers of different materials comprises a second layer that is an inorganic supporting layer.

10. The method of claim 9, wherein the inorganic supporting layer is one of a silicate glass, sapphire, or ALON (aluminum oxynitride) layer.

11. An additive manufacturing system comprising:
an additive manufacturing apparatus configured to construct an object from a light polymerizable resin on a light-transmissive heated window by projection of light through the window in a bottom-up stereolithography process, said heated window comprising a composite of at least two different materials joined with an adhesive layer;
a processor; and
memory storing non-transitory computer readable instructions that, when executed by the processor, cause the processor to perform operations comprising:
(a) slicing a three-dimensional geometry file into a series of sequential images, each sequential image corresponding to a part geometry;
(b) prior to beginning production of said object, calculating temperature fluctuations in the resin for at least a subset of said sequential images upon light polymerization thereof based on sequential exposure of the resin to light, the light corresponding to the series of sequential images, with the calculating carried out for each sequential image of said subset of said sequential images pixel-by-pixel based on resin properties and the corresponding part geometry and further based on window properties including a temperature profile for said heated window; and
(c) producing said object from said light polymerizable resin and said series of sequential images by bottom-up stereolithography, while
(d) modifying said producing based on said calculated temperature fluctuations by:
(i) reducing production speed during at least a portion of the producing step that corresponds to at least one of the subset of said sequential images to avoid exceeding a predetermined temperature limit for said window; or
(ii) activating a window cooler during at least a portion of said producing step that corresponds to at least one of the subset of said sequential images to cool said window and avoid exceeding the predetermined temperature limit for said window.

12. The additive manufacturing system of claim 11, wherein the subset of said sequential images includes images corresponding to portions of the object spaced apart from each other in a Z-direction in fixed increments.

13. The additive manufacturing system of claim 11, wherein said instructions are configured to cause said calculating to be carried out before said producing or concurrently with said producing.

14. The additive manufacturing system of claim 11, wherein said instructions are configured to cause said calculating to be based on planned or actual speed of said producing.

15. The additive manufacturing system of claim 11, wherein said window cooler comprises a Peltier cooler.

16. The additive manufacturing system of claim 11, wherein said composite of said at least two different materials comprises a first layer that is a polymer layer.

17. The additive manufacturing system of claim 16, wherein said polymer layer is a fluoropolymer layer.

18. The additive manufacturing system of claim 16, wherein said composite of said at least two different materials comprises a second layer that is an inorganic supporting layer.

19. The additive manufacturing system of claim 18, wherein the inorganic supporting layer is one of a silicate glass, sapphire, or ALON (aluminum oxynitride) layer.

* * * * *